United States Patent
Scheele

(10) Patent No.: US 7,171,573 B2
(45) Date of Patent: Jan. 30, 2007

(54) SYNCHRONIZATION OF DATA PROCESSING UNITS

(75) Inventor: Oliver Scheele, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 10/899,652

(22) Filed: Jul. 26, 2004

(65) Prior Publication Data

US 2005/0055469 A1    Mar. 10, 2005

(30) Foreign Application Priority Data

Jul. 25, 2003    (DE) ............................... 103 33 932

(51) Int. Cl.
*G06F 1/04*    (2006.01)
*G06F 1/12*    (2006.01)

(52) U.S. Cl. ....................... 713/375; 713/400
(58) Field of Classification Search ...................... None
See application file for complete search history.

(56) References Cited

U.S. PATENT DOCUMENTS

| | | | | |
|---|---|---|---|---|
| 5,689,688 A | * | 11/1997 | Strong et al. | 713/375 |
| 6,647,504 B1 | * | 11/2003 | Van Paepegem | 713/400 |
| 2003/0177154 A1 | * | 9/2003 | Vrancic | 708/160 |

* cited by examiner

*Primary Examiner*—Lynne H. Browne
*Assistant Examiner*—Stefan Stoynov
(74) *Attorney, Agent, or Firm*—Kenyon & Kenyon LLP

(57) ABSTRACT

Timers of a plurality of slave units are synchronized with a timer of a master unit by a) sending a synchronization message on the first network by the master unit, which contains a time measurement of the master unit and a time scale, to the slave units; b) at each slave unit, forming the difference between a time measurement recorded in the slave unit and the time measurement received by the master unit, and correcting the current time measurement of the slave unit by this difference, and, at each unit, the recording of a time measurement upon receipt of the time scale; c) at the master unit, inserting the recorded time measurement into a subsequent synchronization message.

8 Claims, 4 Drawing Sheets

SYNCHRONIZATION OF DATA PROCESSING UNITS

FIELD OF THE INVENTION

The present invention relates to a method for synchronizing a plurality of data processing units in a network, as well as to a network in which the method may be used.

BACKGROUND INFORMATION

The progressive electronification of control tasks in automotive technology has led to the application, in modern motor vehicles, of an ever growing number of electrical and electronic units, such as sensors, actuators and control units for the most various tasks. The expenditure for their wiring is increasing with the number of these units. In order to keep within limits the wiring efforts and the costs connected with them, it has proven expedient that one should no longer connect each individual sensor or each individual actuating mechanism via individual signal lines to a control unit that processes one of the sensing signals of the sensor or supplies actuating signals for the actuating mechanism, but rather that one should connect a plurality of such sensors or actuating mechanisms, in each case via a suitable interface switching operation, to a common bus, on which signals in the form of addressed messages can be transmitted in time division multiplex between the control unit and the diverse interfaces.

Although the use of a bus substantially reduces the wiring effort, this advantage bears the cost that the coordination in time of various sensors and/or actuators is made more difficult. In a bus-supported network, in order to carry out actions coordinated in time of various connected data processing units (by which may be understood especially the combination of a sensor or actuator to its assigned interface switching operation), a command has to be sent to these units before the action that is to be executed, which specifies the action and the point in time of its execution, since, as a result of the time division multiplex operation it cannot be ensured that the bus will be free, at the desired point in time of the action, to send commands for immediate execution of the desired action to the desired data processing units. However, if a command specifying the point in time of an action is sent ahead of time to the data processing units, it is imperative for the coordination in time of the actions to be executed, that the units have a common time standard.

One possibility of establishing such a common time standard for all data processing units is the use of a clock signal, transmitted on the bus, whose periods are also counted by the connected units. However, this solution is unsatisfactory to the extent that it requires its own signal line or a great proportion of the transmission bandwidth of a single bus line, and that counting errors, which may occur at the individual data processing units, based on transmission interference, may only be prevented by costly additional measures.

Another possibility is to equip each data processing unit with its own time signal indicator. However, unavoidable scattering of the operating frequencies of these time signal timing devices may have the result that an incipient synchronicity is lost during the course of time, so that here, too, an exact coordination in time of the actions to be executed by the individual units cannot be guaranteed without any problem.

SUMMARY OF THE INVENTION

The present invention creates a method for synchronizing a plurality of data processing units in a network, which, in a simple manner and without great utilization of the transmission capacity of a bus that connects the units, makes possible an accurate synchronization of the units.

Of the diverse units connected to the first net, the one whose time forms the standard for the other units is designated as the master unit, and the ones that are supposed to adjust their time to the master unit are designated as slave units.

The synchronization between master and slave units is based on the transmission of a synchronization method on the first network which includes a time value of the local timer of the master unit and a time scale.

The time scale is at the disposal of all units simultaneously, ignoring propagation delays in the first network, and is used to record instantaneous time measurement of the local timer of each unit. If, in a later synchronization message, the master unit transmits the time measurement recorded by it to the slave units, the latter are able to recognize this deviation between their local timer and that of the master unit by comparison of the time measurement recorded by them to the transmitted time measurement, and to correct it.

The accuracy of the correction is independent, in this method, of how much time passes between compiling a synchronization message by the master unit and its transmission on the first network. Therefore, it is suitable especially for networks in which this time is not exactly determined, or may vary depending on network utilization, such as particularly the CAN network.

This synchronization message is preferably sent cyclically on the first network.

In order to rule out that, as a result of a correction of the local timer, points in time, which are provided for a certain event or a certain activity of a slave unit, appear twice or are omitted in the time measurement of the slave unit, it is expedient that the master unit, in the synchronization message, specify a point in time for the correction of the timer of the slave units, which may deviate from the point in time of reception of the synchronization message. This point in time is expediently selected as a function of the specific application situation of the present invention at a sufficient spacing of points in time at which actions of the slave unit are provided.

Since the slave unit, after formation of the difference between the time measurement recorded in it and the time measurement transmitted by the master unit, knows the deviation of its local timer from the timer of the master unit, it is in a position to correct the point in time specified for correction by the difference thus obtained, even before it corrects the local timer itself. In this way it is achieved that all slave units correct their local timers, independent of their phase difference from the timer of the master unit, accurately to the point in time specified by the master unit.

The slave units of the first network may, in turn, be master units, designated as sub-master units, of a second network, in which they, on their part, control timers of slave units by a synchronization message transmitted over the second network.

If, in this second network, the time span between the generation of a synchronization message to be transmitted and its transmission in the second network is able to be established, then for synchronizing of the slave units in the second network a simpler method may be used, in which the sub-master unit in each case transmits a synchronization message having a value derived from time measurement of its local timer, to the slave units, and these derive, from the transmitted value, a time measurement to be imported into its local timer. In this context, especially in the case of one of the two derivation procedures, an identical importation of the time measurement may be involved, from the local timer of the sub-master unit into the message, or from the message into the timer of the slave unit, and in the case of the other derivation, a correction may be involved by the known and constant time span between the acquisition of the time measurement in the sub-master unit and the transmission of the message to the slave units.

With respect to this second network, in particular, a LIN (local interconnect network) may be involved.

DETAILED DESCRIPTION

Figure 1:
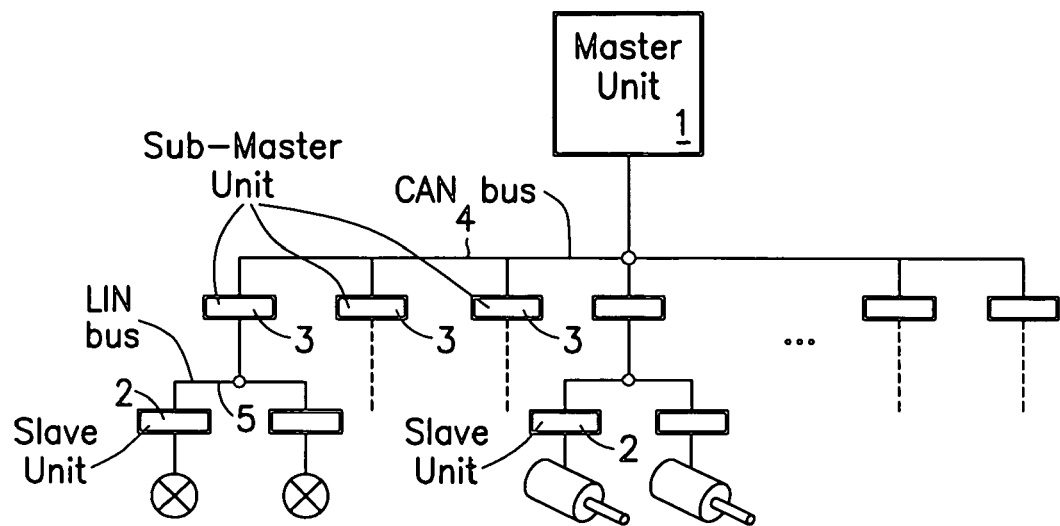
FIG. 1 shows a schematic block diagram of a hierarchical network having two planes in which the present invention is applicable.

FIG. 1 is a block diagram of a hierarchically structured data processing network, in which, between a master unit 1 and a plurality of slave units 2, a middle hierarchical plane of units 3 is inserted, which act as slaves as compared to master unit 1, and as master units as opposed to slave units 2, and shall therefore be denoted here as sub-master units 3. These communicate with master unit 1 via a CAN bus 4 and with slave units 2 via a LIN bus 5.

If, in this case, with respect to CAN bus 4, a single connected unit is designated as master unit 1, this refers only to the property that it has a local timer whose time measurement is committal for all other units 3 connected to CAN bus 4; all units 1, 3 connected to this bus are able to share control over CAN bus 4 in time division multiplex.

On a LIN bus 5, on the other hand, in each case only sub-master unit 3 is entitled to send messages on bus 5; upwards transmission of data from slave units 2 to sub-master unit 3 take place in each case only upon request of sub-master unit 3.

Slave units 2 are in each case composed of an interface for the bus communication and a control circuit for controlling of a connected unit, such as a blinker or a windshield wiper motor of a motor vehicle, locks of a central locking system, etc.

In order to coordinate in time the switching on and off of the blinkers or the movement of the windshield wipers, slave units 2 assigned to these units have to have synchronized local timers. These do not only have to be synchronized within a single LIN network, but for complex control tasks, which, for instance, require the interaction of blinker light-ing with the operation of a central locking system, slave units 2 of various LIN buses 5 must also be synchronized.

A system-wide synchronization takes place in two steps, the first step including the synchronization of all sub-master units 3 with master unit 1, and the second step including the synchronization of slave units 2 with the respective sub-master units 3 assigned to them.

In the following, we look first of all at the synchronization of master unit 1 with sub-master units 3 via CAN bus 4.

Figure 2:
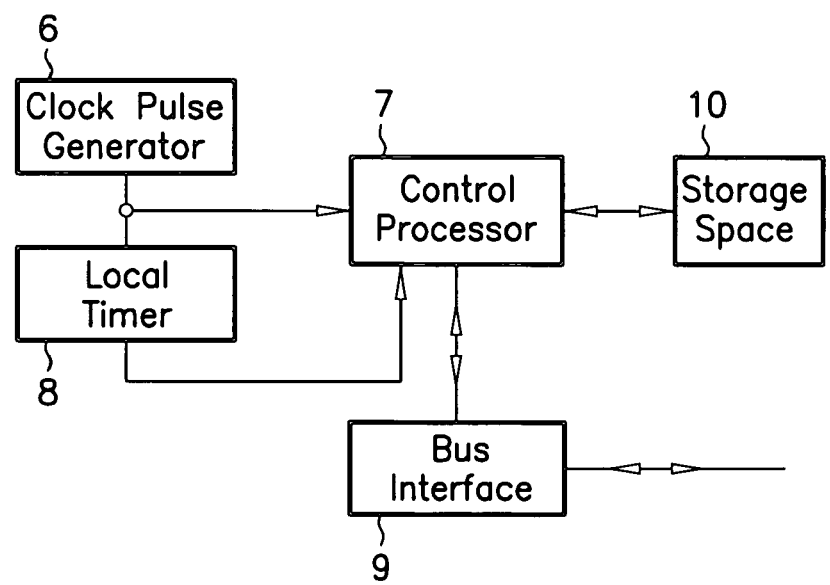
FIG. 2 shows a block diagram of a unit of the network.

FIG. 2 shows schematically the construction of master unit 1. A clock pulse generator 6 supplies a clock signal to a control processor 7, which detects diverse control tasks program-controlled by external commands and data received via CAN bus 4, which are not the subject matter of the present invention, and receive no further treatment here. The clock signal of clock pulse generator 6 also controls a local timer 8 in the form of a digital counter, whose counter content is incremented (or decremented) with each period of the clock signal, and thus represents a time measurement. To one output of timer 8, among other things, control processor 7 is connected in order to read the time measurement of timer 8.

A bus interface 9 communicates, under the control of control processor 7, with CAN bus 4. Among other things, it monitors CAN bus 4 for the appearance of time scales in synchronization messages transmitted over it. It reacts to the appearance of a time scale by interrupting control processor 7, which thereupon reads the time measurement of timer 8 and stores it in a register or a specified storage space 10. The content of storage space 10 is inserted as a time measurement into the next synchronization message which control processor 7 generates and sends on CAN bus 4.

The circuit construction having clock pulse generator 6, control processor 7, timer 8, bus interface 9 and memory 10 is the same for sub-master units 3 as for master unit 1, and is therefore not specially described; the two types of units differ only in their operating manner of their control processors, as will subsequently be explained in the light of the time diagram in FIG. 3.

Three parallel time lines M, C, SM in this diagram respectively symbolize timer 8 of master unit 1, CAN bus 4 and timer 8 of one of sub-master units 3. The diagram begins with a synchronization message, shown as a rectangle SYNC on CAN bus 4. The end of this message, symbolized by a vertical dotted line t1, represents a time scale to which master and sub-master unit 1, 3 react by storing the time measurements of their counters, that are shown in the figure as number values above each hexagon symbolizing a clock-pulse period, in their register 10. At time t1, the plotted values are both zero, i.e. the timers of master and sub-master units 1 and 3 are synchronous to ±one clock-pulse period.

At any desired later point in time, for instance, whenever a count value of 250 appears, of the timer of master unit 1, the latter composes a new synchronization message and transmits it to bus interface 9, in order to have it sent to CAN bus 4. At this time, the CAN bus is busy with another message MSG, so that the new synchronization message SYNC is only able to be sent when the bus becomes free. The time at which bus interface 9 will be able to send the synchronization message is not known to control processor 7 of master unit 1 when the message is generated.

If the transmission of new message SYNC ends at time t2, the timer of master unit 1 has the value 255, and that of sub-master unit 3 has the value 254. Both values are recorded in storage location 10 of the respective units provided for this.

Count value 255 of the timer of the master unit is inserted into the next synchronization message SYNC. The transmission of this message SYNC ends at time t3, at a count value 4 of the timer of master unit 1 or 3 of the timer of sub-master unit 3. The latter now forms the difference between count value 255 of the master unit received in synchronization message SYNC and its own count value 254, and recognizes from this that it is delayed by one clock-pulse period. It thereupon increases the current count value of its own timer by the difference that was determined, and is thereby perfectly synchronized again.

Figure 3:
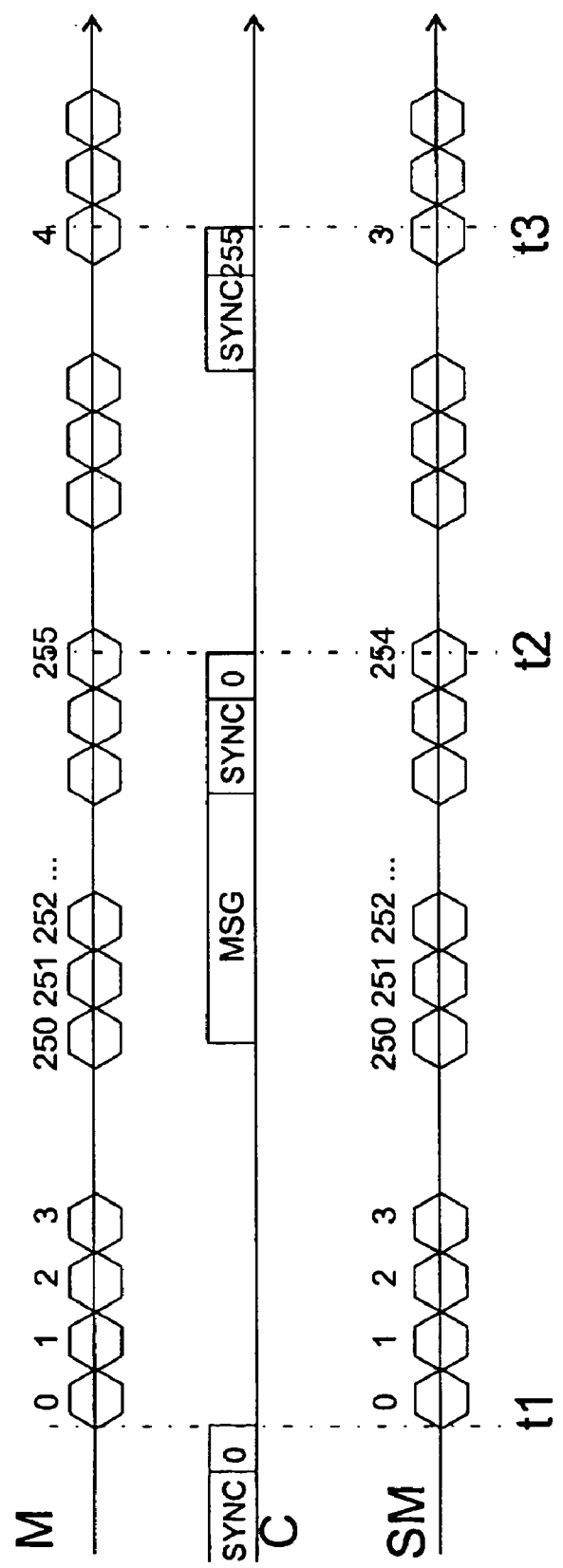
FIG. 3 shows a time diagram of the course of the synchronization between the master unit and a slave unit of the middle hierarchical plane, also designated as sub-master unit, according to a first embodiment of the present invention.
Figure 4:
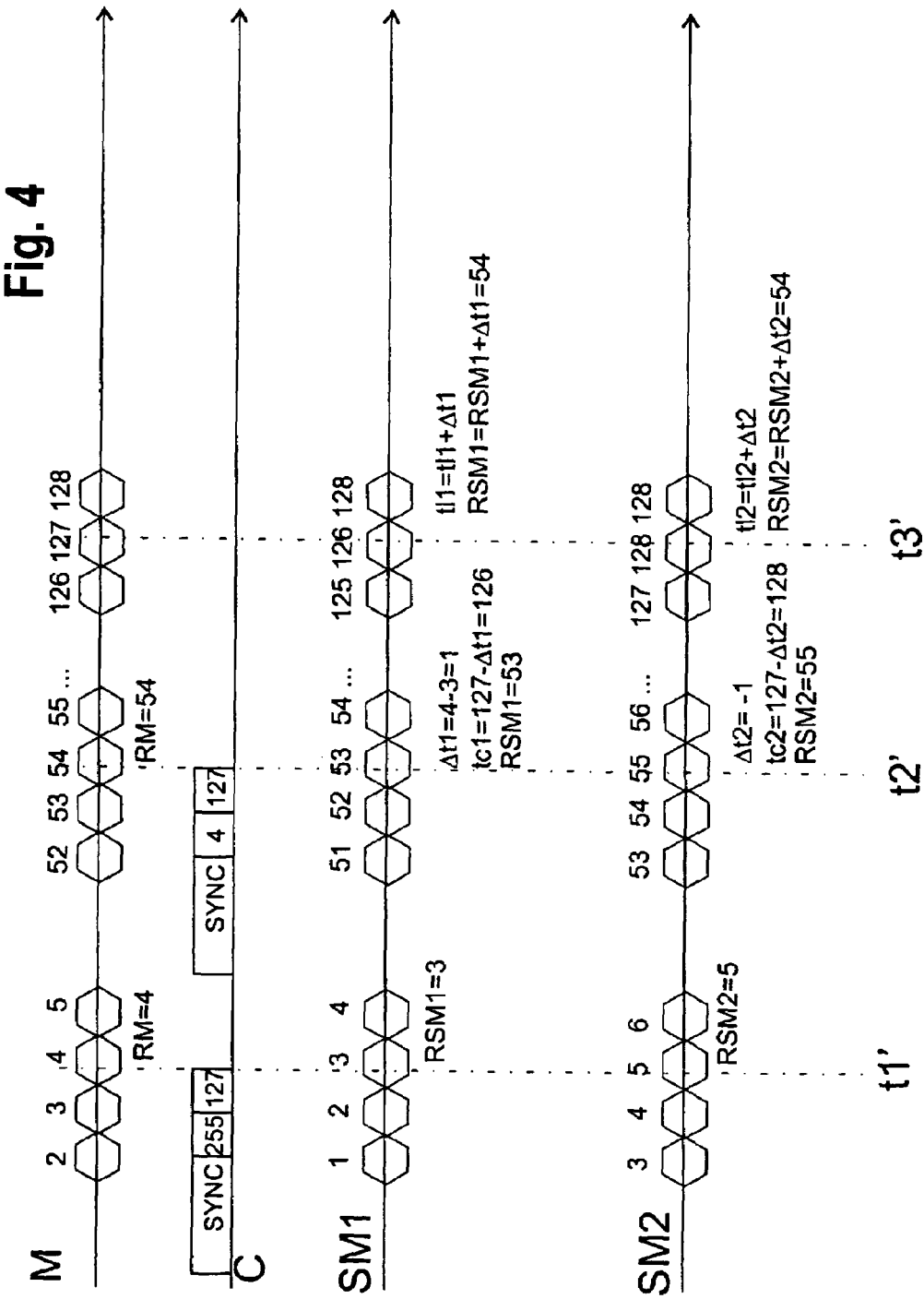
FIG. 4 shows a time diagram of the course of the synchronization between the master unit and the sub-master units, according to a second embodiment of the present invention.

FIG. 4 shows, in an analogous representation to that of FIG. 3, the course in time of the synchronization according to a further refined embodiment of the present invention. In this case, four time lines are observed, one denoted as C, for CAN bus 4, and respectively one, denoted as M, for a master unit 1, and two, denoted as SM1, SM2 for two sub-master units 3. A first synchronization message SYNC, transmitted on bus 4, contains two data fields, here having contents 255 and 127, on whose function we shall go into further detail below. The end of the transmission of synchronization message SYNC represents a time scale, whose appearance on the bus at time t1' causes the master unit and both sub-master units to record the time measurements of their local timers, in this case RM=4 at master unit 1 and RSM1=3 and RSM2 at the two sub-master units 3.

A second synchronization message transmitted on the bus contains in its first data field time the measurement RM=4 of master unit 1 that was recorded before. The sub-master units which receive this data value, respectively calculate their own counter deviation $\Delta t_i = RM - RSM_i$, i=1,2. At the same time, at the end of second synchronization message SYNC, at time t2', a new time measurement RM=54, RSM1=53 and RSM2=55 is recorded and stored at all units.

The second data value included in the synchronization message, here 127, designates an arbitrarily definable point in time, or, more accurately, a counter content of the timer of master unit 1, at which a correction of the timers of the sub-master units is to take place. The sub-master units correct this data value by the determined deviation $\Delta t_i$, and thus obtain as correction points $tc1=127-\Delta t1=126$ for the first sub-master unit and $tc2=127-\Delta t2=128$ for the second sub-master unit.

In each case, when the local timers of the sub-master units accept the count values tc1, tc2 thus calculated, that is, at point in time t3' in FIG. 4, the corrections of these count values by the determined error of $\Delta t1$ and $\Delta t2$ are carried out, so that in the subsequent clock cycle all timers are exactly synchronized. At the same time, time measurements RSM1, RSM2 that were stored for the next synchronization operation are corrected in a corresponding manner, with signs reversed, so that, in the case observed here, they both assume the value 54. When the next synchronization message is transmitted, which contains the value 54 as the time measurement of the master unit, it is determined that the timer of all units are synchronous, and no further correction is undertaken.

Figure 5:
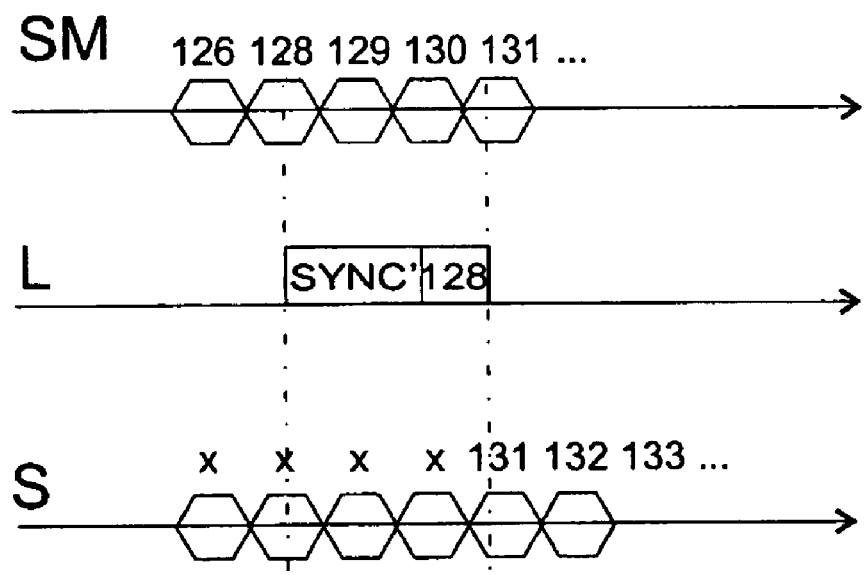
FIG. 5 shows a time diagram of the synchronization between a sub-master unit and slave units connected to it, of a lower hierarchy plane.

FIG. 5 shows the course of the synchronization among a sub-master unit 3 and a slave unit 2 via LIN bus 5, in the light of three time lines SM, L, S which are assigned respectively to sub-master unit 3, bus 5 and slave unit 2. Each time sub-master 3 has itself been synchronized by master unit 1, independently of whether this synchronization has or has not led, as in the case shown in the figure, to a correction of the timer of the sub-master unit (skipping the clock cycle having the number 127), it carries out on its part a synchronization of the slave units 2 connected to it. Since sub-master unit 3 has control over LIN bus 5, it is able, at any point in time determined by it, to begin sending a synchronization message SYNC on LIN bus 5, which contains as parameter the number, here 128, of the clock cycle in which sending was begun.

The transmission of synchronization message SYNC' makes use of a fixed number of clock cycles—in the present example, a duration of three clock cycles is assumed—so that at clock pulse 131 the synchronization message is fully present at slave unit 2. This adds the known transmission duration to the clock cycle number received by sub-master unit 3 and sets its own local timer to that result, which is 131 here.

What is claimed is:

1. A method for synchronizing local timers of a plurality of slave units with a local timer of a master unit, in a first network that connects the master unit and the slave units, the method comprising:
   sending a synchronization message on the first network by the master unit, the synchronization message including a time measurement of the master unit and a time scale;
   at each slave unit, forming a difference between a current time measurement recorded in the slave unit and the time measurement of the master unit;
   correcting the current time measurement of the slave unit by the difference;
   at each of the master unit and the slave units, recording a respective one of the time measurement of the master unit and the current time measurements of the slave units upon receipt of the time scale; and
   at the master unit, inserting the time measurement recorded therein into a subsequent synchronization message.

2. The method as recited in claim 1, wherein the synchronization message is sent cyclically.

3. The method as recited in claim 1, wherein the master unit specifies in the synchronization message a point in time for a correction of the timers of the slave units.

4. The method as recited in claim 3, further comprising:
   causing at least one of the slave units to correct the point in time specified for the correction by the difference.

5. The method as recited in claim 1, wherein the first network includes a CAN network.

6. The method as recited in claim 1, wherein:
   at least one of the slave units of the first network is simultaneously the master unit of a second network, denoted as sub-master unit, and which synchronizes the slave units assigned thereto by a synchronization message transmitted on the second network.

7. The method as recited in claim 6, wherein:
   the sub-master unit transmits, in the synchronization message, a value derived from the time measurement of the local timer of the sub-master unit,
   each slave unit assigned to the sub-master unit takes on in its local timer a time measurement derived from the transmitted value, and
   during a derivation, one of the slave units including the sub-master unit takes into consideration a transmission duration of the synchronization message on the second network.

8. The method as recited in claim 6, wherein the second network includes a LIN network.

* * * * *